United States Patent
Kim

(10) Patent No.: US 10,224,770 B2
(45) Date of Patent: Mar. 5, 2019

(54) ROTOR ASSEMBLY AND MOTOR INCLUDING THE SAME

(71) Applicant: LG Innotek Co., Ltd., Seoul (KR)

(72) Inventor: Yong Chul Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 309 days.

(21) Appl. No.: 15/163,273

(22) Filed: May 24, 2016

(65) Prior Publication Data

US 2016/0352163 A1 Dec. 1, 2016

(30) Foreign Application Priority Data

May 27, 2015 (KR) .................. 10-2015-0073896

(51) Int. Cl.
*H02K 1/27* (2006.01)
*H02K 1/30* (2006.01)
*H02K 1/28* (2006.01)
*H02K 15/03* (2006.01)
*H02K 15/12* (2006.01)

(52) U.S. Cl.
CPC ........... *H02K 1/2706* (2013.01); *H02K 1/278* (2013.01); *H02K 1/2753* (2013.01); *H02K 1/28* (2013.01); *H02K 1/30* (2013.01); *H02K 15/03* (2013.01); *H02K 15/12* (2013.01); *H02K 2201/06* (2013.01); *H02K 2201/15* (2013.01)

(58) Field of Classification Search
CPC .... H02K 1/2706; H02K 1/2753; H02K 1/278; H02K 1/28; H02K 1/30; H02K 15/03; H02K 15/12; H02K 2201/06; H02K 2201/15

USPC ..................................... 310/156.01
See application file for complete search history.

(56) References Cited

U.S. PATENT DOCUMENTS

| | | | | |
|---|---|---|---|---|
| 6,737,781 B2 * | 5/2004 | Osada | ..................... | H02K 11/21 310/152 |
| 2006/0284505 A1 * | 12/2006 | Han | ..................... | H02K 1/12 310/155 |
| 2013/0147299 A1 * | 6/2013 | Rahman | ..................... | H02K 1/2766 310/156.01 |
| 2014/0292133 A1 * | 10/2014 | Murota | ..................... | H02K 1/2766 310/156.01 |

FOREIGN PATENT DOCUMENTS

| | | |
|---|---|---|
| CN | 202424343 U | 9/2012 |
| JP | 07312852 A | 11/1995 |
| JP | 2014003795 A | 1/2014 |

(Continued)

OTHER PUBLICATIONS

Extended European Search Report dated Oct. 14, 2016 in European Application No. 16164856.3.

*Primary Examiner* — Forrest M Phillips
(74) *Attorney, Agent, or Firm* — Saliwanchik, Lloyd & Eisenschenk

(57) ABSTRACT

The present invention relates to a rotor assembly including a yoke member having a cylindrical shape with a hole through which a rotating shaft passes, a plurality of magnet groups attached to an outer circumferential surface of the yoke member, and a first molding unit formed along an inner circumferential surface of the yoke member and having an arrangement hole of the rotating shaft at a center part thereof.

5 Claims, 6 Drawing Sheets

(56) References Cited

FOREIGN PATENT DOCUMENTS

| | | |
|---|---|---|
| JP | 2015073350 A | 4/2015 |
| JP | 2015208057 A | 11/2015 |
| KR | 101012256 B1 | 2/2011 |
| KR | 1020110072678 A | 6/2011 |

* cited by examiner (a)

(b)

… (1)

ROTOR ASSEMBLY AND MOTOR INCLUDING THE SAME

CROSS-REFERENCE TO RELATED APPLICATION

This application claims priority under 35 U.S.C. § 119 to Korean Patent Application No. 10-2015-0073896, filed on May 27, 2015, which is hereby incorporated by reference in its entirety.

BACKGROUND

Field of the Invention

The present invention relates to a rotor assembly and a motor including the same.

Discussion of Related Art

Generally, a motor is a device generating a rotating force of a rotating shaft by electromagnetic interaction between a rotor and a stator and is variously used as a power source for the whole industry.

The motor includes a cylindrical housing with an upper portion and a bracket coupled to the upper portion of the housing, the cylindrical housing and the bracket forming the appearance of the motor, and a rotating shaft is supported by the housing and the bracket. A rotor having magnets is disposed at an outer circumferential surface of the rotating shaft, and a stator having a stator core and a coil is coupled to an inner circumferential surface of housing. When a current is applied to the stator, power is generated while the rotating shaft is rotated by electromagnetic interaction between the rotor and the stator.

The motor is classified into an interior permanent magnet motor (IPM-type motor) and a surface-mounted permanent magnet motor (SPM-Type Motor) according to arrangement of the magnets. In the case of the IPM-type motor, generally, the magnets are inserted into a rotor core, and the rotor core and the magnet are fixed to each other with an adhesive.

Particularly, in the case of the SPM-type motor, when the rotor core to which the magnet is attached is manufactured, electrical steel sheets with magnetism are manufactured to be divided and stacked on top of each other. There are problems of a lot of time for a process and high material costs as a whole.

BRIEF SUMMARY

The present invention is directed to a rotor assembly capable of, particularly, simplifying a structure of a rotor core by a structure having an integrated yoke member with magnetism rather than a multilayer structure as a structure of the rotor core used in a motor, and reducing material costs and process costs by having magnets disposed at the yoke member and a molding unit integrally molding a shaft and the rotor core to bind the shaft to the rotor core only through a molding process without a process of press-fitting the shaft and the rotor core.

According to an aspect of the present invention, there is provided a rotor assembly including a yoke member having a cylindrical shape with a hole through which a rotating shaft passes, a plurality of magnet groups attached to an outer circumferential surface of the yoke member, and a first molding unit formed along an inner circumferential surface of the yoke member and having an arrangement hole of the rotating shaft formed at a center part thereof.

According to another aspect of the present invention, there is provided a motor including a coil unit wound along an inner circumferential surface of a motor housing, a rotating shaft mounted at a center part of the housing to be rotatable using bearings, and the above-described rotor assembly coupled in a structure in which the rotating shaft passes through the rotor assembly.

According to the embodiments of the present invention, the rotor assembly and the motor including the same can remarkably reduce manufacturing costs compared to a structure of the rotor core in which a plurality of unit rotor cores are separately manufactured in a multilayer structure to be attached by having a structure having an integrated yoke member with magnetism rather than a multilayer structure as a structure of the rotor core used in the motor, and also can reduce process costs by having magnets disposed on the integrated yoke member according to the embodiment of the present invention and a molding unit integrally molding the shaft and the rotor core to bind the shaft to the rotor core only through a molding process without a process of press-fitting the shaft and the rotor core.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION

Figure 1:
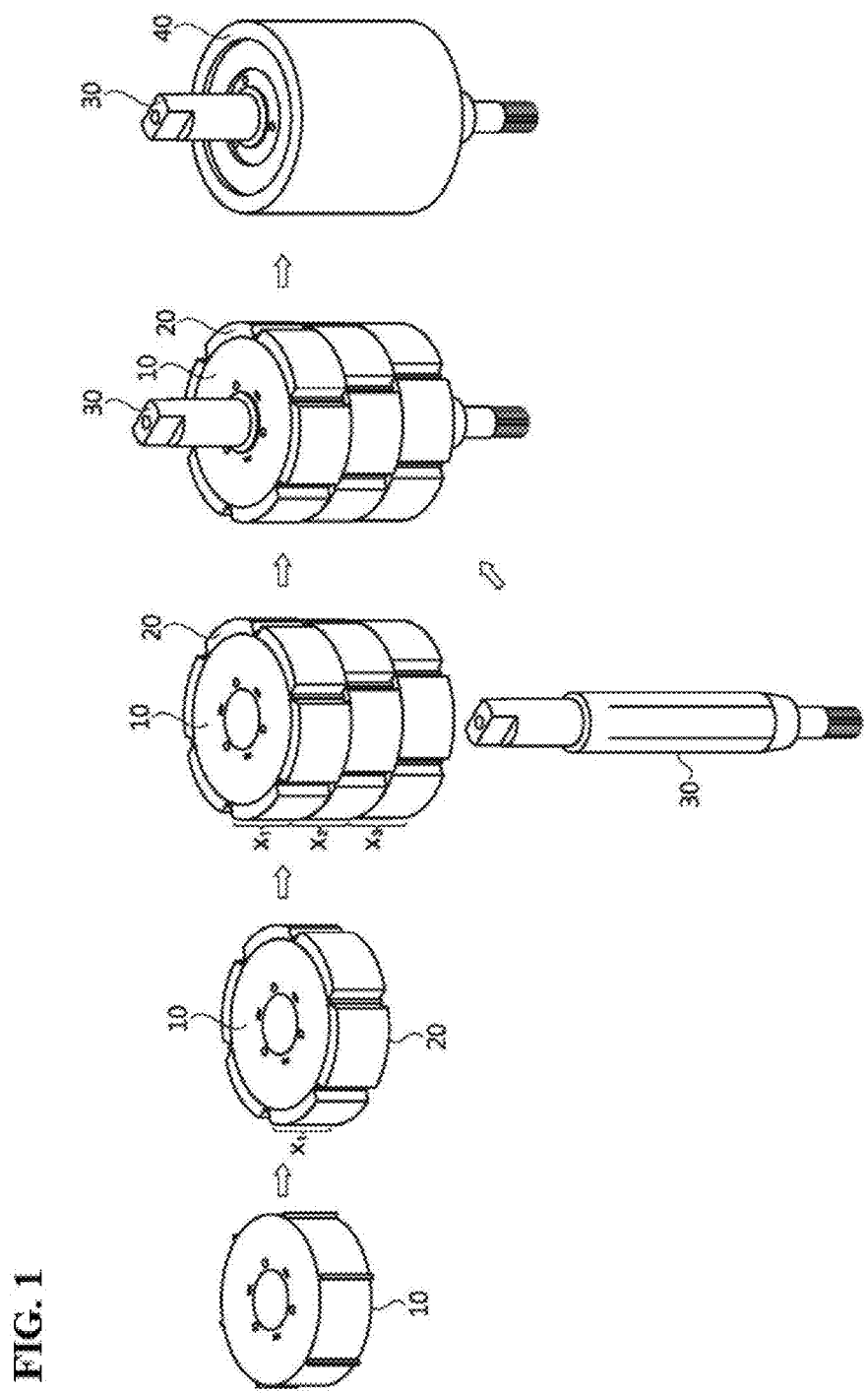
FIG. 1 illustrates a manufacturing process of a rotor assembly as a comparison to one embodiment of the present invention.

Hereinafter, configurations and operations according to the present invention will be described in detail with reference to the accompanying drawings. In the description with reference to the accompanying drawings, like elements are designated by the same reference numerals regardless of drawing numbers, and duplicated descriptions thereof will be omitted. Although the terms "first," "second," etc. may be used herein to describe various elements, these elements should not be limited by these terms. These terms are only used to distinguish one element from another.

FIG. 1 illustrates a manufacturing process of a rotor assembly as a comparison to one embodiment of the present invention.

Generally, as shown in FIG. 1, (a) a rotor core 10 is prepared, and (b) drive magnets 20 are attached to an outer circumferential surface of the rotor core 10 using an adhesive. A plurality of unit rotor cores x1 to x3 having the same size as the manufactured unit rotor core x1 are stacked on top of each other to form the rotor core as shown in FIG. 1(c). Then, as shown in FIG. 1(d), a rotating shaft 30 is inserted into a hole of a center part of the rotor core, and a molding member 40 is applied to an outer circumferential surface after FIG. 1(e), and thus the rotor assembly is manufactured.

In the process of manufacturing the rotor core described above, a rotor core to which the magnets 20 are attached is manufactured to be divided into plural numbers. When the core member of a unit rotor core is manufactured, an electrical steel sheet with magnetism is manufactured to be divided to form unit rotor cores, and the unit rotor cores are stacked on top of each other, and thus it takes a lot of time for the process and material costs are high as a whole.

Figure 2:
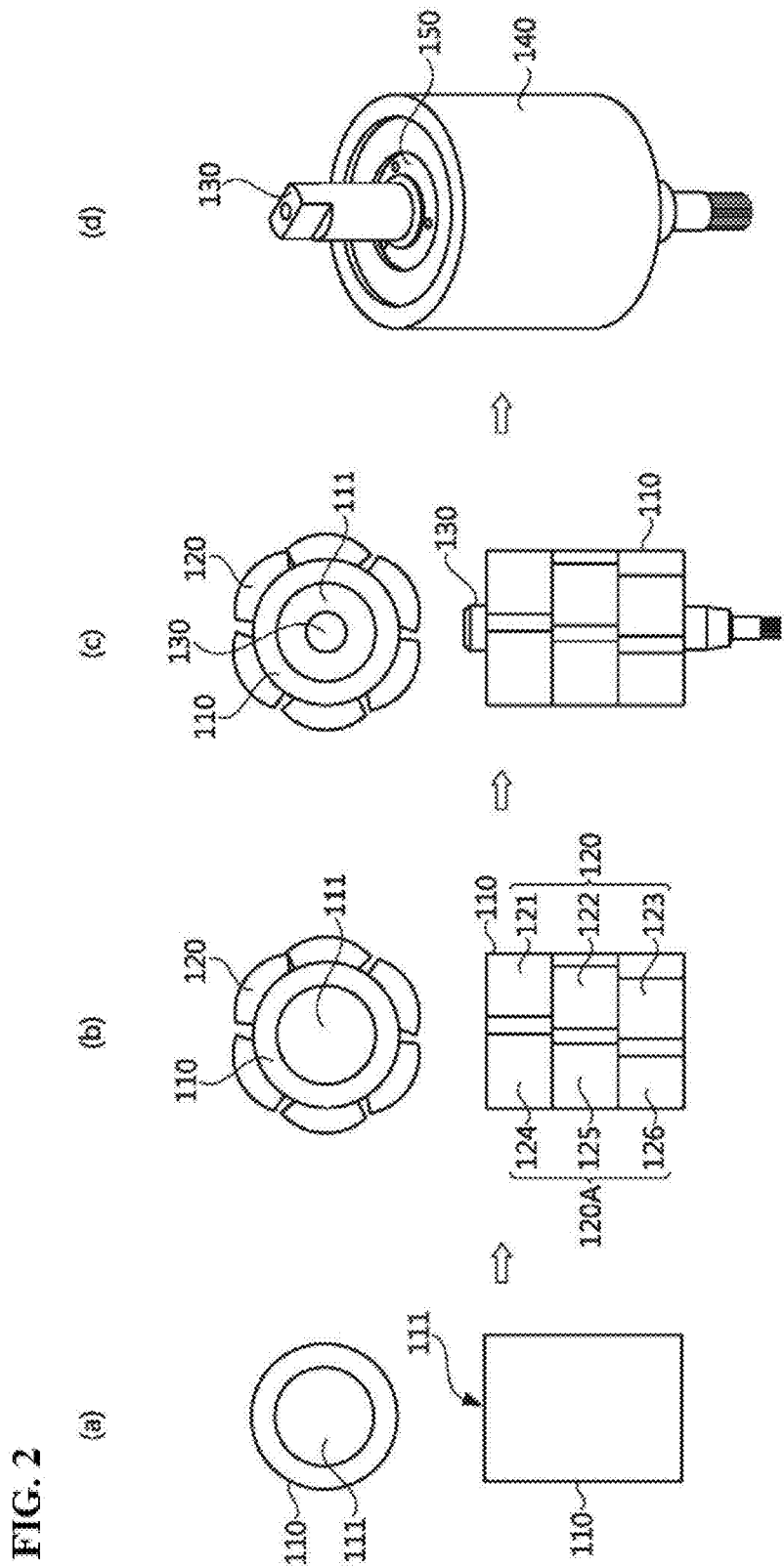
FIG. 2 illustrates a manufacturing process of the rotor assembly according to one embodiment of the present invention.

In the embodiment of the present invention, as shown in FIG. 2, instead of a structure in which separate electrical steel sheets are divided and manufactured and magnets are attached thereto, the rotating shaft and the rotor core are molded in a single process by a structure in which magnets are formed using a cylindrical yoke member 110 with a hole through which the rotating shaft passes later on, thereby simplifying the structure and increasing efficiency of the process.

Specifically, FIG. 2 is a manufacturing process of the rotor assembly according to one embodiment of the present invention, wherein the upper part of each drawing is a top view, and the lower part thereof is a side view.

As shown in FIG. 2(a), first, the yoke member 110 having a cylindrical shape and having a hole 111 vertically formed at the center part thereof is prepared. In this case, the yoke member 110 may be formed of a magnetic material. That is, in the yoke member 110 of the present invention, the cylindrical yoke member is integrally formed rather than the structure in FIG. 1 in which the divided unit rotor cores are manufactured, magnets are attached to the unit rotor cores, and the unit rotor cores are stacked, compressed and coupled again.

After that, (b) a plurality of the magnet groups 120 are attached to an outer circumferential surface of the yoke member 110. The plurality of magnet groups 120 attached to the outer circumferential surface of the yoke member 110 using an adhesive may be disposed. Particularly, the magnet groups 120 disposed in a longitudinal direction of the yoke member 110 include a plurality of unit magnets 121, 122, and 123. The unit magnets 121, 122, and 123 adjacent to each other may be disposed so that the boundary parts of the unit magnets cross each other. That is, as shown in FIG. 2(b), in the magnet groups 120 disposed in the longitudinal direction of the yoke member 110, for example, the unit magnet 121 on the upper part of the magnet group and the unit magnet 122 on the lower part thereof attached to be adjacent to the upper part are disposed so that adjacent surfaces cross each other, thereby enhancing the magnetic properties.

Further, as shown in FIG. 2(b), a plurality of magnet groups 120 and 120A may be disposed in the longitudinal direction of the yoke member, and the plurality of magnet groups 120 and 120A adjacent to each other may be disposed to be spaced apart each other.

Then, as shown in FIG. 2(c), a rotating shaft 130 is aligned at a center part of the hole 111 in the yoke member 110. When the rotating shaft 130 is aligned at the center part of the hole 111, a space may be formed at an outer circumferential surface of the rotating shaft and an inner circumferential surface of the yoke member 110. The space, the yoke member 110, and the outer circumferential surfaces of the plurality of magnet groups 120 are molded through a molding process. When the molding is completed, the rotating shaft in the yoke member is strongly attached and adheres to an inner surface of the yoke member 110 using a first molding unit 150, and the outer circumferential surface of the yoke member 110 is also molded using a second molding unit 140 as a whole, thereby protecting the magnets and preventing the magnets from being detached from the yoke member. Further, the first molding unit 150 and the second molding unit 140 are formed of the same material through a single molding process at the same time, thereby increasing convenience of the process and reducing material costs.

Figure 3:
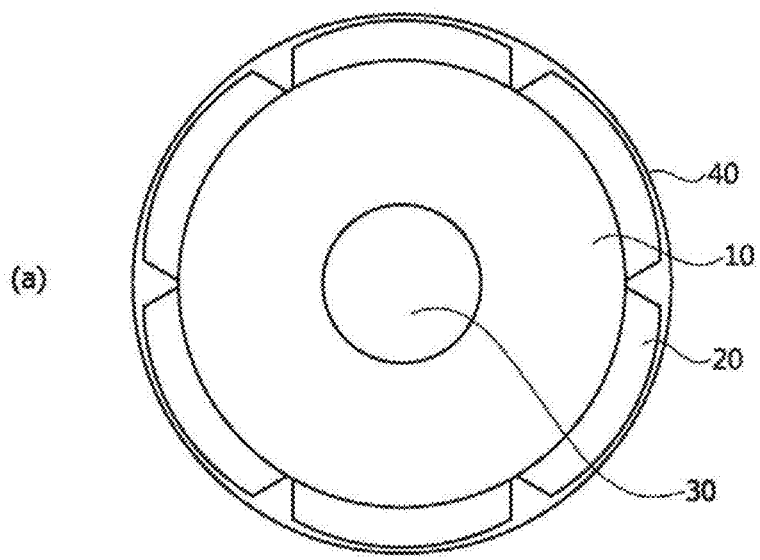
FIG. 3 is a cross-sectional schematic view illustrating a structure difference between the rotor assembly in FIG. 1 and the rotor assembly in FIG. 2.
Figure 3:
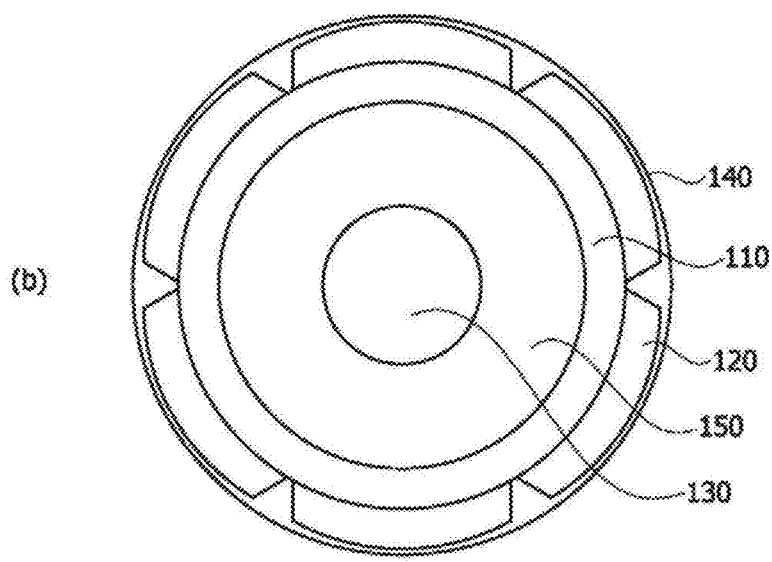

FIG. 3 is a cross-sectional schematic view illustrating a structure difference between the rotor assembly in FIG. 1 and the rotor assembly in FIG. 2.

Referring to FIG. 3, (a) in the case of a general rotor, the rotor core 10 is compressed and coupled to the rotating shaft 30, and an inner surface of the electrical steel sheet is in contact with the rotating shaft. Also, the magnets 20 are disposed on the outer circumferential surface of the rotor core 10, and the outer circumferential surface of the magnet 20 is coated with the molding member 40. In this structure, particularly, as shown in FIG. 1(c), a plurality of unit rotor cores are independently manufactured and attached through a multilayering process.

On the other hand, as shown in FIG. 3(b), the rotor according to the embodiment of the present invention is disposed in a structure in which the rotating shaft 130 and the yoke member 110 are spaced apart from each other and a space between the rotating shaft 130 and the yoke member 110 is filled with the first molding unit 150, and thus the rotating shaft 130 and the yoke member 110 are strongly bound to each other. In this case, a material of the molding unit may be a nonmagnetic material.

Also, the yoke member 110 is formed of a cylindrical member, the magnet groups 120 are disposed on the outer circumferential surface of the yoke member 110, and the second molding unit 140 is formed at the outer circumferential surfaces of the magnets. The structure does not need a process of processing the electrical steel sheets for multilayering since the rotor core is formed in a structure of an integrated yoke member with magnetism rather than the multilayer structure like the structure of FIG. 1, thereby reducing manufacturing costs and process time.

Figure 4:
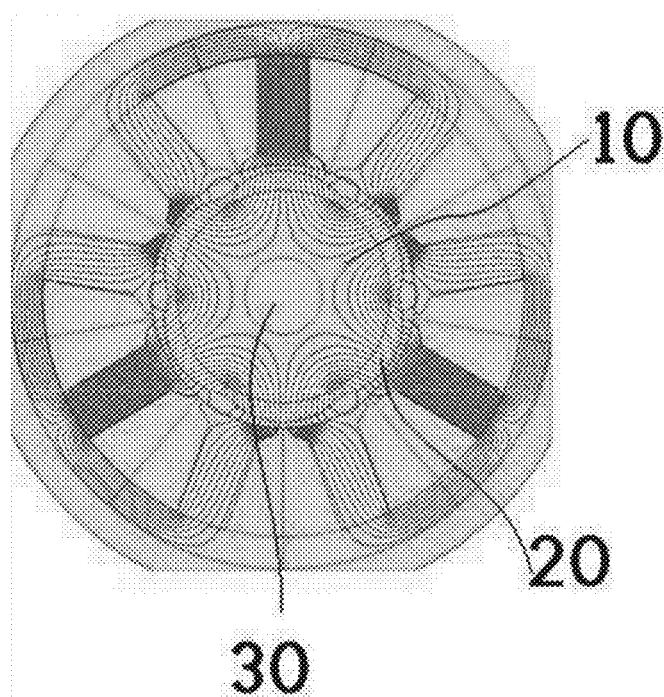
FIGS. 4 and 5 are electromagnetic field image views showing a rotor having a multilayer structure of an electrical steel sheet in FIG. 1 and a rotor according to one embodiment of the present invention having an integrated yoke structure in FIG. 2 by an electromagnetic field simulation tool.
Figure 5:
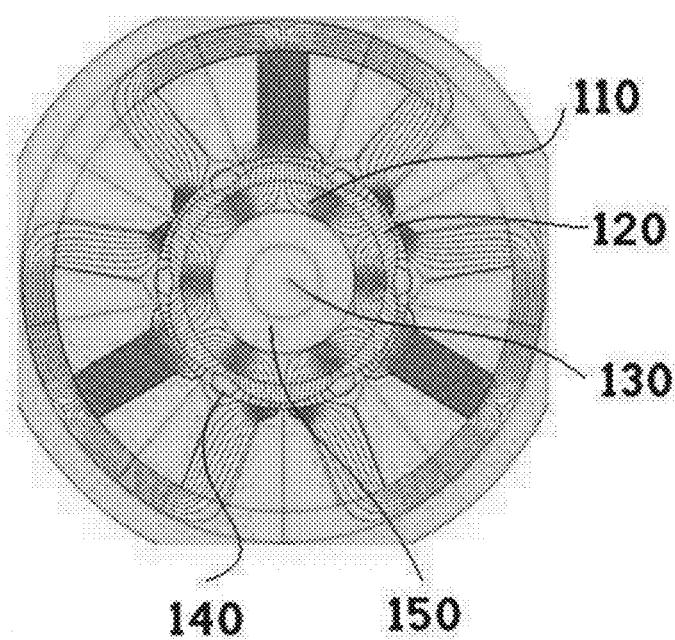

FIGS. 4 and 5 are electromagnetic field image views of a rotor having a multilayer structure of an electrical steel sheet in FIG. 1 and a rotor according to one embodiments of the present invention having an integrated yoke structure in FIG. 2.

That is, FIG. 4 shows a general structure of the rotor in FIG. 1 in which a shaft and a rotor core are in contact with each other, and FIG. 5 shows simulated magnetic properties in the structure of FIG. 2 in which a nonmagnetic molding member is disposed between the rotating shaft and the yoke member with magnetism, and thus it is confirmed that there is no large difference in a magnetization density, direction, or uniformity.

Figure 6:
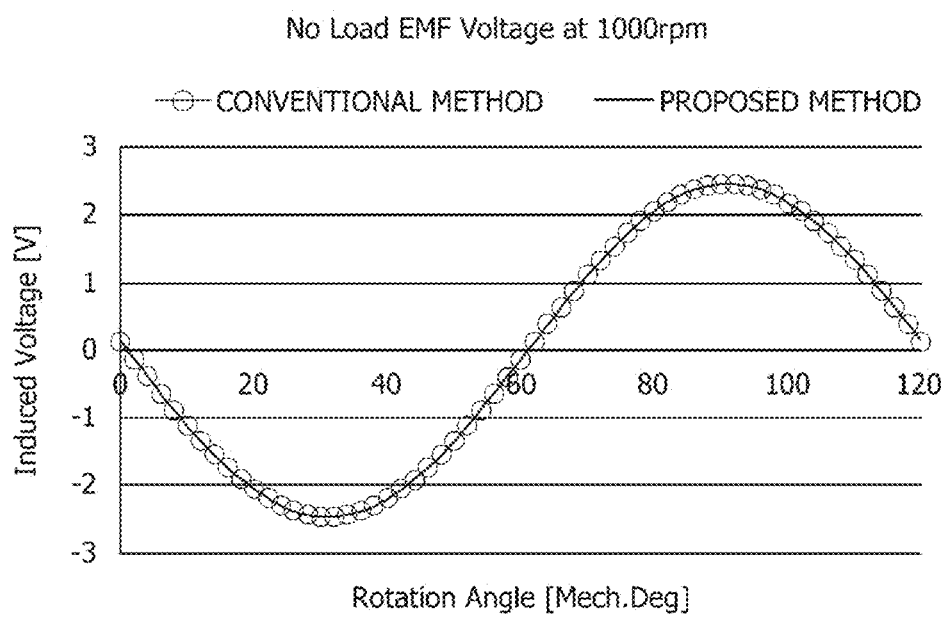
FIGS. 6 and 7 are graphs comparing experiment results of FIGS. 4 and 5.

More specifically, looking into comparative simulation data for these magnetic properties, FIG. 6 shows a comparison between induced voltages of the motors generated when the motors that are formed with the rotor assemblies of FIGS. 1 and 2 are operated at 1000 rpm. Since the maximum induced voltage in the structure of FIG. 1 is 2462 Vpk/krpm, and the maximum induced voltage in the structure of FIG. 2 is also 2462 Vpk/krpm, it is confirmed that the properties of the induced voltages are the same.

Figure 7:
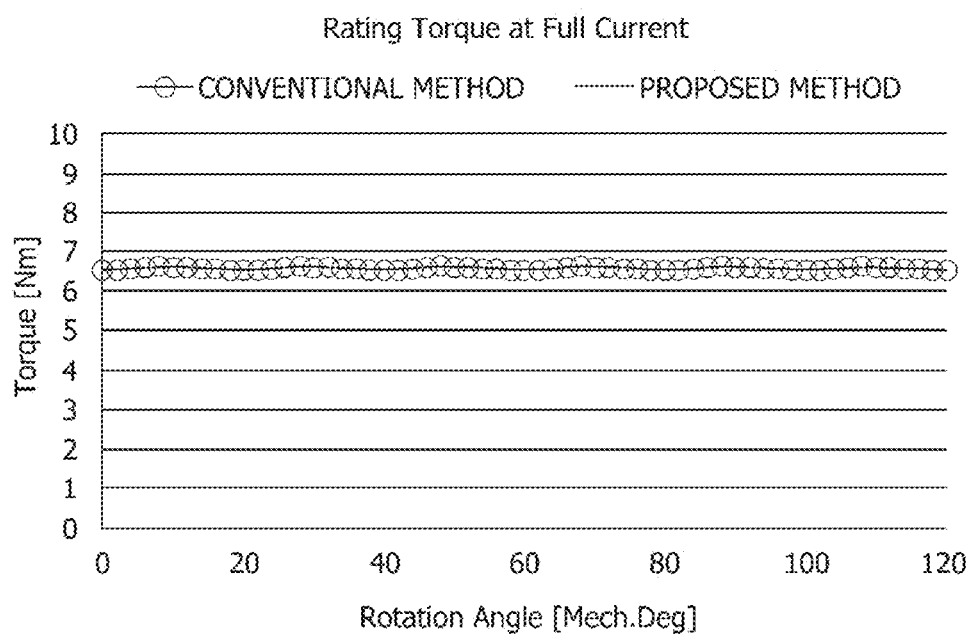

Further, FIG. 7 is a graph illustrating a comparison result of torque generated in each of the motors when the maximum current is applied to the two comparison groups experimented in FIG. 6. That is, looking into torque when the motors are operated under a condition of the same maximum current and speed, since the average torque of the motor according to the structure in FIG. 1 is 6.6 Nm, and the average torque of the motor according to the structure in FIG. 2 is also 6.6 Nm, it is confirmed that there is no difference in the generated torque.

That is, as a result of comparison between the properties of the motors according to methods of FIGS. 1 and 2 through the electromagnetic field interpretation, it is confirmed that the equivalent property is implemented without degradation of performance compared to the conventional general rotor assembly in a structure of the rotor assembly according to the embodiment of the present invention. Therefore, in the case of the rotor assembly according to the embodiment of the present invention, the motor extremely excellent in reducing a process condition or material costs while maintaining the equivalent performance can be formed.

Figure 8:
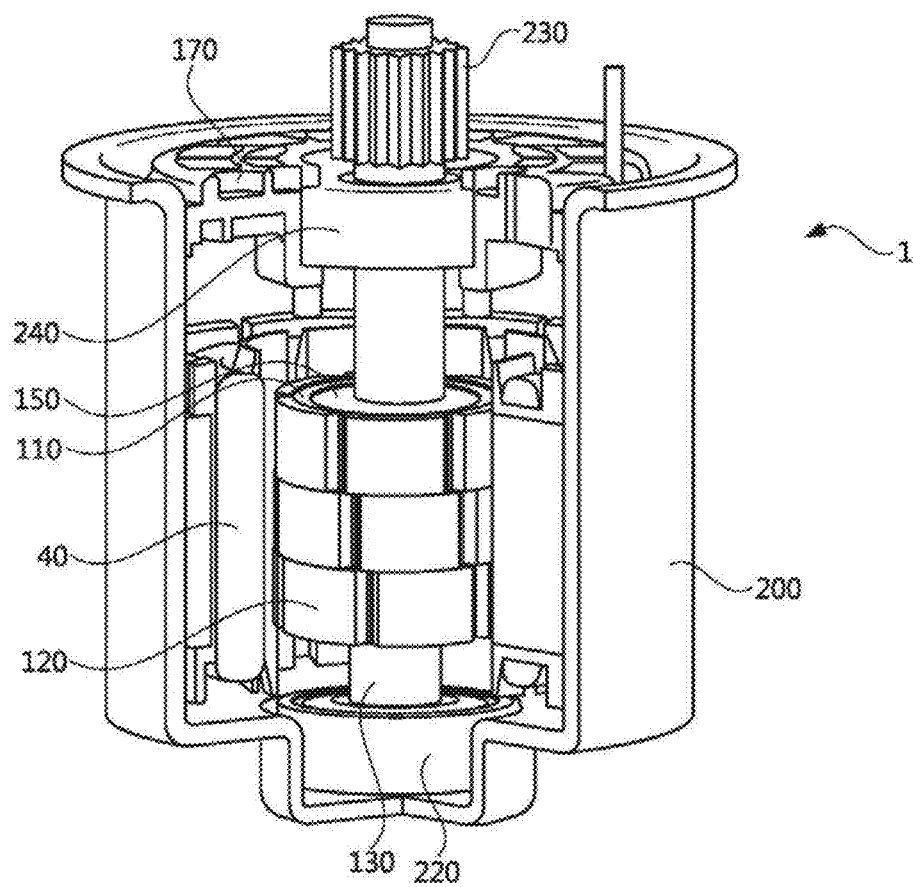
FIG. 8 is an implementation example view of a motor to which the rotor assembly according to the embodiment of the present invention is applied.

FIG. 8 is a schematic view showing, as an embodiment, the structure of the motor manufactured using the rotor assembly according to the embodiment of the present invention described above in FIG. 2.

Specifically, in the SPM-type motor manufactured using the rotor assembly according to the embodiment of the present invention, as shown in FIG. 1, the rotating shaft 130 is mounted at a center part of a motor housing 200 with an open upper part to be rotatable using bearings 220 and 240, and a coil 40 is wound along an inner circumferential surface of the motor housing 200 at a predetermined thickness. In this case, the coil 40 is electrically connected with external power to receive a current and functions as a stator of the motor along with the motor housing 200.

As shown in FIGS. 2 and 8, the yoke member 110 that has a cylindrical shape and a predetermined length is formed at the outer circumference of the rotating shaft 130, the first molding unit 150 is installed between the rotating shaft and the yoke member, and the plurality of the magnet groups 120 are installed along the outer circumferential surface of the yoke member at regular intervals. Here, the yoke member 110 and the magnet groups 120 function as a rotor of a motor along with the rotating shaft 130. Also, the rotating shaft 130 has a gear unit 230 mounted at a front end thereof to be engaged with a steering column (not shown).

In addition, a second yoke member 170 may be provided at an upper part of the motor housing 200 to be separated from the magnet groups 120 at a predetermined distance. The second yoke member 170 may be formed of a conductive material to control the flow of magnetic force generated in the magnet groups 120, i.e. a magnetic flux. Therefore, when the current is supplied to the coil 40, Lorentz force perpendicular to the magnetic force is generated by the electromagnetic force generated in the magnet groups 120, and thus the rotor of the motor rotates.

The above-described implementation example of the motor is one of examples to which the rotor assembly according to the embodiment of the present invention is applied and can be applied to various types of motors.

The detailed description of the present invention as described above has been described with reference to certain preferred embodiments thereof. However, various modifications may be made in the embodiments without departing from the scope of the present invention. The inventive concept of the present invention is not limited to the embodiments described above, but should be defined by the scope of claims and equivalents thereof.

DESCRIPTION OF SYMBOLS

110: YOKE MEMBER
111: HOLE
120: MAGNET GROUPS
130: ROTATING SHAFT
140: SECOND MOLDING UNIT
150: FIRST MOLDING UNIT

What is claimed is:

1. A rotor assembly comprising:
a yoke member having a cylindrical shape with a hole through which a rotating shaft passes;
a plurality of magnet groups attached to an outer circumferential surface of the yoke member;
a first molding unit formed along an inner circumferential surface of the yoke member and having an arrangement hole of the rotating shaft at a center part thereof; and
a second molding unit configured to seal outer circumferential surfaces of the yoke member and the magnet groups,
wherein the yoke member is formed of a magnetic material,
wherein the first molding unit is formed of a nonmagnetic material,
wherein the first molding unit and the second molding unit are formed of the same material, and
wherein the first molding unit and the second molding unit are formed through a single molding process.

2. The rotor assembly of claim 1, wherein the magnet groups include a plurality of unit magnets disposed in a longitudinal direction of the yoke member and the plurality of unit magnets are disposed so that boundary parts of the unit magnets adjacent to each other cross each other.

3. The rotor assembly of claim 2, wherein the plurality of magnet groups are disposed to be spaced apart from each other along the outer circumferential surface of the yoke member.

4. A motor comprising:
a motor housing;
a coil unit wound along an inner circumferential surface of the motor housing;
a rotating shaft mounted at a center part of the motor housing to be rotatable using bearings; and
a rotor assembly coupled so that the rotating shaft passes therethrough,
wherein the rotor assembly includes:
a yoke member having a cylindrical shape with a hole to be penetrated;
a first molding unit attached to the rotating shaft and configured to fill up the hole along an inner circumferential surface of the yoke member;
a plurality of magnet groups disposed along an outer circumferential surface of the yoke member; and
a second molding unit formed of the material same as that of the first molding unit and configured to seal outer circumferential surfaces of the yoke member and the plurality of magnet groups,
wherein the first molding unit and the second molding unit are formed through a single molding process.

5. The motor of claim 4, wherein the magnet groups include a plurality of unit magnets disposed in a longitudinal direction of the yoke member, and the plurality of unit magnets are disposed so that boundary parts of the unit magnets adjacent to each other cross each other.

* * * * *